United States Patent [19]

Petrie et al.

[11] Patent Number: 4,699,573

[45] Date of Patent: Oct. 13, 1987

[54] TRANSFORMER OIL PUMP BEARING MATERIAL

[75] Inventors: Edward M. Petrie, Muncie; Clifford J. Bell, Mount Pleasant, both of Ind.

[73] Assignee: Westinghouse Electric Corp., Pittsburgh, Pa.

[21] Appl. No.: 310,569

[22] Filed: Oct. 13, 1981

[51] Int. Cl.[4] .......................... F04B 39/06; F16C 33/20

[52] U.S. Cl. .................................... 417/370; 384/905; 384/907

[58] Field of Search ................ 308/DIG. 8, DIG. 14; 384/297, 378; 417/370, 369

[56] References Cited

U.S. PATENT DOCUMENTS

| | | | |
|---|---|---|---|
| Re. 28,354 | 3/1975 | Orkin | 308/DIG. 14 X |
| 3,115,839 | 12/1963 | Pollack et al. | 417/369 X |
| 4,111,499 | 9/1978 | McCloskey | 308/DIG. 8 X |
| 4,320,431 | 3/1982 | Bell | 310/68 B X |

*Primary Examiner*—Richard E. Gluck
*Assistant Examiner*—Peter M. Cuomo
*Attorney, Agent, or Firm*—L. P. Johns

[57] ABSTRACT

Fluid-cooled electrical apparatus characterized by a new and improved pump for circulating the fluid within the apparatus. The pump has a motor portion in fluid communication with a pump portion, non-electrically conductive bearings supporting a common shaft between the two portions. The bearings being comprised of a polyamideimide thermoplastic resin.

6 Claims, 2 Drawing Figures

TRANSFORMER OIL PUMP BEARING MATERIAL

BACKGROUND OF THE INVENTION

1. Field of the Invention:

The invention relates in general to fluid-cooled electrical apparatus, such as power transformers, and in particular to an improved fluid circulating pump used in such apparatus.

2. Description of the Prior Art:

Electrical power transformers are commonly cooled with an insulating and cooling dielectric fluid such as mineral oil. Those with higher KVA ratings required forced cooling in order to keep their size reasonable for production, shipping and installation. Forced cooling is accomplished by a pump or pumps pulling the oil from external radiator-type heat exchanges and forcing it through the transformer.

Generally, these oil circulation pumps have the motor portion in fluid communication with the pump portion of the oil pump. Alternate possible designs could have the motor sealed from the pump by a stuffing box surrounding a common shaft. Pumps with the motor portion sealed off from the pump portion have inherent cooling, lubrication and maintenance disadvantages. The motor must be cooled by some means. Air-cooled motors are much larger than their oil-cooled counterpart and require periodic lubrication. Oil-cooled motors that are sealed from the impeller side of the pumping unit require an expensive sealed oil-to-oil or oil-to-air heat exhcanger for cooling. Also required are provisions to accommodate oil expansion with increasing temperature within the sealed system. Thus, pumps having oil-cooled motors that are sealed from the impeller side of the pumping unit are not practical from an economic viewpoint. Both types of alternate units require periodic maintenance of the means for sealing the common shaft.

Since a transformer is relatively maintenancefree and is generally unattended, the advantages of a pump unit with the motor portion in fluid communication with the impeller or pump portion can be appreciated. This design allows elimination of the shaft sealing means and its inherent maintenance. In addition, a small portion of the transformer oil being pumped through the apparatus is circulated through the motor for cooling and lubrication purposes, thus reducing the size and cost of the unit over the alternatives discussed above. However, wear of the metallic parts of pumps of this design causes contamination of the dielectric cooling fluid with submicron-sized electrically conductive particles which are then distributed throughout the transformer by the pump. This electrically conductive particle contamination tends to reduce the dielectric properties of the insulating and cooling fluid as well as any solid dielectric material within the transformer on which the particles might collect. In addition, contamination of gross amounts of non-electrically conductive particles can also be damaging to the dielectric properties of the insulating fluid.

Non-metallic or non-electrically conductive bearings alone will not solve this contamination problem. Should a bearing fail, metallic particles would still be rubbed off the rotor and stator as these components cannot be replaced with non-electrically conductive substitutes. Also, an uncontrolled quantity of non-electrically conductive particles could be present from wear of non-electrically conductive bearings. This contamination problem of conductive and/or non-conductive particles is even present in the isolated motor/impeller design since, should a bearing completely fail, the shaft seal would likely be damaged, allowing contaminants on the motor side to migrate to the impeller side and be circulated throughout the system. The only previous known arrangement that would not be plagued with this contamination problem would be a separate motor and separate pump combination. This arrangement, however, must have a means such as a universal joint or constant velocity joint to couple their shafts together. Special alignment procedures are required for this arrangement, as well as maintenance of the coupling means and the sealing means. Therefore, the separate motor and pump combination unit is not among those under active consideration at the present time.

Accordingly, there is a need for a non-conducting bearing material that (1) is an insulator, (2) is temperature stable, (3) does not affect the properties of the transformer oil, (4) is unaffected by the oil, and (5) is easily formable to desired shapes. The bearing of this invention is an improvement over the bearing shown in U.S. Pat. No. 4,320,431.

SUMMARY OF THE INVENTION

Briefly, the present invention is a new and improved fluid-cooled electrical apparatus, such as a liquid-filled transformer having a new and improved pump for circulating the cooling/insulating fluid within the apparatus. The pump has a motor portion in fluid communciation with a pump portion, non-electrically conductive non-metallic bearings supporting a common shaft between the two portions, the bearings comprising a polyamide-imide thermoplastic resin having a filler consisting of about 3% titanium trioxide, and characterized by the properties of resistance to elevated temperatures up to about 500° F., very low coefficients of thermal expansion and of friction, as well as being resistant to attack by aromatic and aliphatic hydrocarbons.

DESCRIPTION OF PREFERRED EMBODIMENTS

An electrical power transformer 10 (FIG. 1), which may be constructed according to the teachings of the invention, includes a magnetic core-winding assembly 12 disposed within a tank 14. The tank 14 is filled to a level 16 with a liquid insulating and cooling medium or dielectric, such as mineral oil. The magnetic core-winding assembly 12 is immersed in the liquid dielectric, which aids in insulating the various electrical conductors from one another, and from ground, and the liquid dielectric also serves to cool the transformer 10.

Heat exchangers or coolers, shown generally at 18 and 20, are connected to the tank 14 via fluid conductor means with the liquid dielectric circulating therethrough by forced circulation, to remove the heat from the liquid dielectric which it has picked up from the magnetic core-winding assembly 12.

Transformer 10, in this example, is a three-phase transformer of the core form type, but is to be understood that the invention is applicable to any type of fluid-cooled electrical apparatus, such as transformers, reactors, contactors and other devices in which fluid movement without contamination due either to metallic particles, or non-metallic particles is required.

Figure 1:
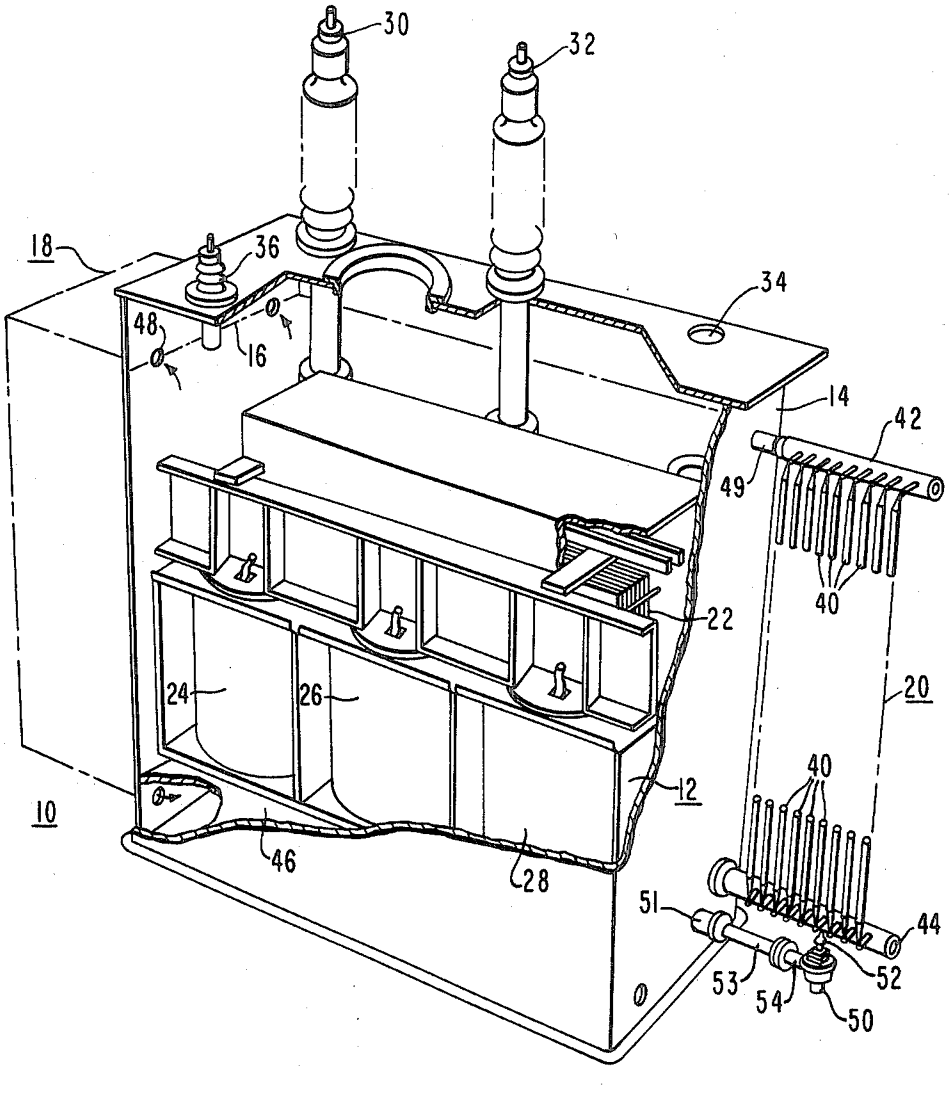
FIG. 1 is a pictorial view of a transformer partially cut away and partially in phantom which may be constructed according to the teachings of the invention.

More specifically, transformer 10 includes a magnetic core 22 and phase-winding assemblies 24, 26 and 28 disposed about winding legs of the magnetic core 22. Each phase winding assembly includes low- and high-voltage windings concentrically disposed about a winding leg of the magnetic core, with the high-voltage windings being connected to high-voltage bushings, of which two bushings 30 and 32 are shown in FIG. 1, with the third high-voltage bushing being mounted in opening 34. The low-voltage windings, if connected in wye, have their neutral ends connected to neutral bushing 36, and their other ends are connected to low-voltage bushings disposed on the portion of the tank cover cut away in FIG. 1.

Transformer 10 is cooled by circulating the liquid dielectric upwardly through the tank 14, entering the tank below the barrier 46, which directs the liquid dielectric upwardly through ducts in the windings in a predetermined pattern. The liquid dielectric leaves the tank through openings disposed in the upper portion of the tank, such as through opening 48, and flows downwardly through heat exchangers 18 and 20 (where heat is removed) from the liquid dielectric) and then back into the tank below the barrier layer 46. Each of the heat exchangers, such as heat exchangers 20, includes a plurality of hollow, flat, fin-type elements 40, which are in fluid communication with upper and lower headers 42 and 44, respectively. Only a sufficient number of elements 40 and headers 42 and 44 are illustrated in FIG. 1 to properly illustrate the construction, as there is usually a large plurality of rows of such elements in each core or heat exchanger. Further, the heat exchangers may be disposed on one or more sides of the transformer, depending upon the specific rating and cooling requirements of the apparatus.

The upper header 42 is connected directly to tank 14 through fluid conductor means 49, while the lower or collecting header 44 is connected to tank 14 through fluid conductor means 51 and 53, and a liquid pump 50. The pump 50 includes an inlet 52 which is connected to header 44 via suitable fluid conductor means, and an outlet 54 which is connected to tank 14 via fluid conductor means 53 and 51.

Because transformers, such as transformer 10, are relatively maintenance-free apparatus, and are generally unattended, the design of pumps (such as pump 50) has been made to ensure this same condition of little or no maintenance. To accomplish this end, pumps such as pump 50 are made with an integral, hermetically sealed motor in fluid communication with the pump itself, thus eliminating shaft sealing means and its inherent maintenance. The small portion of the pumped transformer oil is bled off and circulated through the motor, to cool and lubricate the motor, and make it maintenance free. This also allows a smaller physical size than would be required by alternative designs. One detrimental effect of a pump of this design that must be guarded against is the contamination of the dielectric fluid being circulated by the pump with metallic or conductive particles from bearings, rotor and stator, etc. generated in the motor area and transported out into the main transformer oil flow by that oil used in cooling the motor. Pump 50 was developed to eliminate this problem of contamination of the dielectric cooling medium with electrically conductive particles, and minimizing contamination with non-electrically conductive particles, and their subsequent circulation throughout the apparatus.

Figure 2:
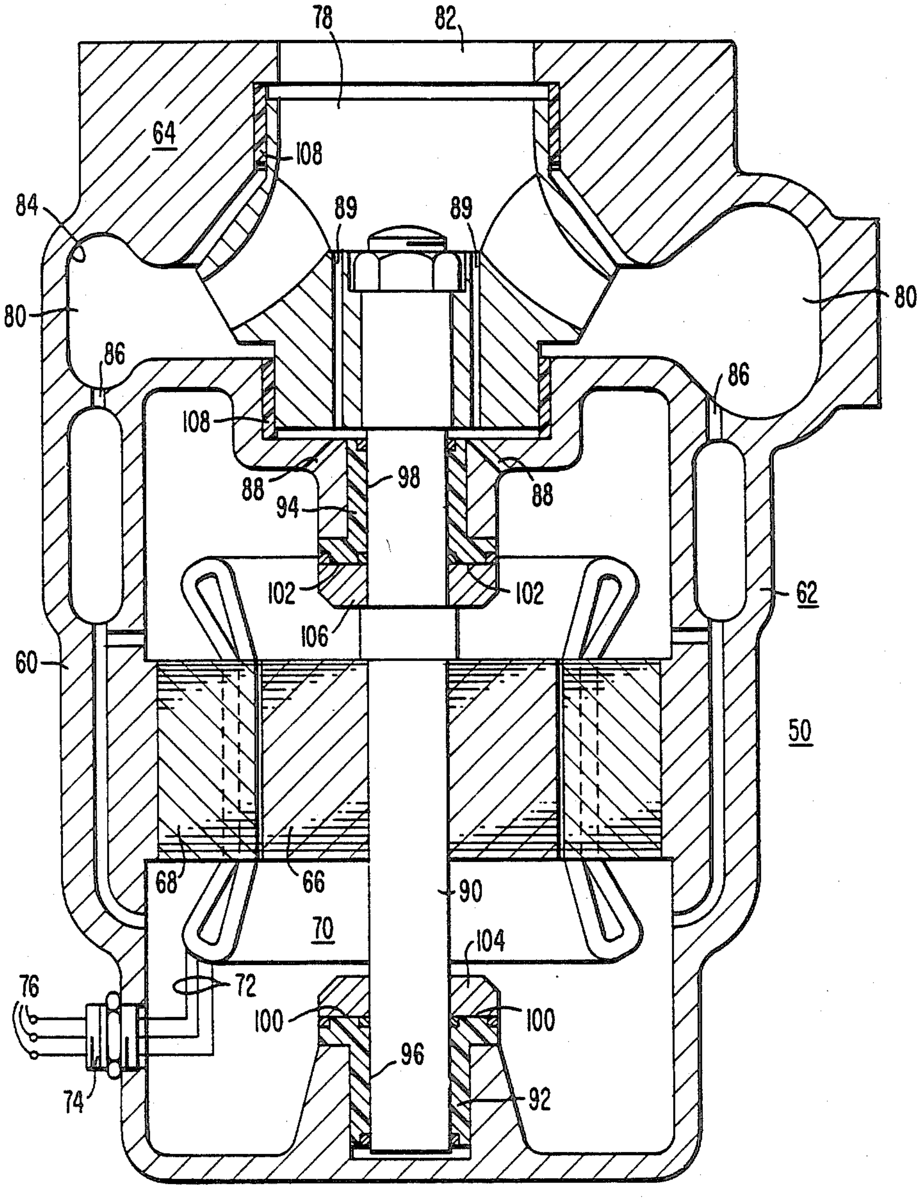
FIG. 2 is a cross-sectional view of a pump constructed according to the teachings of the invention, which may be used with the transformer shown in FIG. 1.

More specifically, pump 50 includes housing 60 (FIG. 2) having motor portion 62 and pump portion 64. Motor portion 62 includes rotor 66 and stator 68 disposed in motor chamber 70. Rotor 66 and stator 68 are formed in the conventional manner. Stator 68 is energized by electrical wires 72 in the conventional manner, with three wires being shown as required for a three-phase motor. Electrical wires 72 pass through fluid-tight conduit 74 and terminate at terminals 76, which are terminals suitable for connection to an external power supply. Pump portion 64 includes an impeller 78 having impeller ports 89. Motor portion 62 and pump portion 64 of pump 50 are in fluid communication with each other by means of fluid orifices 86 and end bell ports 88 connecting motor chamber 70 with impeller chamber 80.

Rotor 66 and impeller 78 are mounted on a rotatable metallic shaft 90 which extends between the motor portion 62 and the pump portion 64 of housing 60. Shaft 90 is mounted for rotation in housing 60 by means of first and second non-electrically conductive bearings 92 and 94, respectively. Bearings 92 and 94 include sleeve surfaces 96 and 98, respectively, disposed radially adjacent to and in near contact with shaft 90, with sufficient oil lubrication clearance between the two thrust surfaces 100 and 102. The thrust surfaces 100 and 102 are disposed perpendicular to sleeve surfaces 96 and 98, respectively, for purposes of example. However, it is to be understood that the thrust surfaces may be at any angle which will accept thrust loads.

First and second metallic thrust collars 104 and 106, respectively, are rigidly disposed on shaft 90 axially adjacent to and in near contact with thrust surfaces 100 and 102, respectively disposed with axial clearance for lubrication. Thrust surfaces 100 and 102 both face inward and thrust collars 104 and 106 both face outward so as to prevent shaft 90 from movement in either axial direction beyond a predetermined safe amount. To avoid torsional strain from the second non-electrically conductive bearing 94, and to provide for additional support for impeller 78, non-electrically conductive wearing rings 108 may be inserted between impeller 78 and housing 60. Wearing rings 108 may be made from the same materials used for the non-metallic or non-electrically conductive bearings 92 and 94.

During operation of pump 50, rotation of impeller 78 moves the fluid to be pumped from the suction side 82 (corresponding to inlet 52 in FIG. 1) of impeller chamber 80 to the pressure side 84 of impeller chamber 80. (The outlet of pump 50, corresponding to outlet 54 of FIG. 1, would be located along a portion of the pressure side 84 of chamber 80 which is not shown in the cross-sectional view of FIG. 2). Since the fluid orifices 86 pass through housing 60 to enter the pressure side 84 of impeller chamber 80, there will be a small bleed off of oil into the motor chamber 70. This oil circulates in the motor chamber 70, cooling motor portion 62 of pump 50, and lubricating and cooling first and second non-metallic or non-conductive bearings 92 and 94, respectively. The oil subsequently returns to the suction side 82 of the impeller chamber 80, passing through end bell ports 88 of the housing 60 and impeller conduits 89.

In accordance with this invention the bearings 92, 94, as well as the wearing rings 108 are non-conducting material comprised of a polyamide-imide thermoplastic, such as a resin provided undr the trademark Torlon which is commercially available from Amoco Chemical Corporation. This resin preferably has a filler composed only of about 3% titanium trioxide ($TiO_3$) and does not contain contaminants or other conducting fillers which might affect its insulating properties. Advantages of this resin is that it has superior resistance to elevated temperatures, withstanding continuous exposure up to about 500° F. The resin has a low coefficient of thermal expansion of about $3.6\times10^{-5}$ cm/° C. and has a high creep resistance to provide excellent dimensional stability over a wide temperature range. The resin is chemically resistant to attack by aromatic and aliphatic hydrocarbons, such as toluene and mineral oil. Moreover, it exhibits a low coefficient of friction of about 0.2 against 1018 carbon steel and a high resistance to creep and wear.

Although this resin is a polyamide-imide thermoplastic resin, it serves more satisfactorily for the desired properties where it contains a filler composed of about 3% $TiO_3$ as indicated above. The most unique property of the resin is its ability to survive stress that would otherwise cause failure in standard bronze-steel bearing systems and thermoset resin systems. In part, this is due to its exceptional physical properties, and in part it is due to the viseo-elastic behavior under heat and stress. Experiments have shown that the resin is likely to "re-form" around areas of high stress which could be caused by misalignment of parts, sharp projections, either from part manufacture or contamination. This self-healing characteristic is extremely attractive in transformer oil pump applications.

Moreover, the resin is readily adapted to conventional high-volume processing techniques because it can be injection-molded into complex, precise parts or extruded and machined to extremely close tolerances. These fabrication processes can be completed at very low cost.

Although the particular resin described above is an ideal transformer oil bearing material, other similar materials of the polyamide-imide family, or with similar characteristics also may be included. Other combinations of the resin and fillers, exhibiting the same characteristics, are included which exhibit the properties of: electrical-resistance, temperature stability, low coefficient of expansion, reforming in high stress areas, resistance to aromatic and aliphatic hydrocarbons, and relatively low coefficient of friction when lubricated.

What we claim is:

1. Electrical apparatus comprising:
a tank;
a liquid dielectric disposed in said tank;
a motor-pump unit for circulating said liquid dielectric within said tank, said motor-pump unit including a housing having a motor portion and a pump portion;

a rotatable metallic shaft extending between said motor portion and said pump portion;
first and second sleeve bearings mounting said shaft for rotation in said housing;
said motor portion and first and second sleeve bearings being in fluid communication with said light dielectric, to cool and lubricate said motor portion and said first and second sleeve bearings;
said bearings each having a sleeve surface disposed radially adjacent to and in near contact with the periphery of said shaft, said bearings being comprised of non-electrically conductive material including a polyamide-imide resin and a filler consisting of about 3% of titanium trioxide.

2. The device of claim 1 characterized by the polyamide-imide resin being thermoplastic.

3. A motor pump for circulating a fluid comprising:
a housing having a motor portion and a pump portion;
a rotatable shaft extending between the motor portion and the pump portion;
sleeve bearings mounting the shaft for rotation in the housing;
said motor portion and sleeve bearings being in fluid communication with a fluid circulated by the pump portion, to thereby lubricate and cool the motor portion and sleeve bearings;
the sleeve bearing comprising a polyamide-imide resin and a filler system consisting of about 3% of titanium trioxide and having resistance to elevated temperatures up to about 500° F.; and
the sleeve bearing also being characterized by a coefficient of thermal expansion of about $3.6\times10^{-5}$ cm/° C. and by a coefficient of friction of about 0.2 against 1018 carbon steel.

4. The motor pump of claim 3 characterized by having a resistance to attack by aromatic and aliphatic hydrocarbons.

5. The motor pump of claim 4 wherein the polyamide-imide resin is thermoplastic.

6. A motor pump for circulating a fluid within electrical apparatus comprising:
a housing having a motor portion and a pump portion;
a rotatable shaft extending between the motor portion and the pump portion;
sleeve bearings mounting the shaft for rotation in the housing;
the motor portion of the housing and said sleeve bearings, being in fluid communication with a fluid circulated by the pump portion, to thereby lubricate and cool the motor portion and
the sleeve bearing comprising a polyamide-imide resin and a filler consisting of about 3% of titanium trioxide and having resistance to elevated temperatures up to about 500° F., and
the sleeve bearing also being characterized by a coefficient of thermal expansion of about $3.6\times10^{-5}$ cm/° C. and by a coefficient of friction of about 0.2 against 1018 carbon steel.

* * * * *